Patented Aug. 27, 1946

2,406,722

UNITED STATES PATENT OFFICE 2,406,722

PRESERVING RUBBER

John R. Vincent, Wilmington, Del., assignor to E. I. du Pont de Nemours & Company, Wilmington, Del., a corporation of Delaware No Drawing. Application February 24, 1944, Serial No. 523,746

15 Claims. (Cl. 260—800)

This invention relates to preserving rubber and more particularly to increasing the effectiveness of antioxidants in rubber.

It has long been proposed to preserve rubber, that is, to inhibit the deterioration of rubber due to the action of light, heat and oxygen, by incorporating in the rubber various organic compounds, commonly termed antioxidants. Since the discovery of rubber antioxidants, their efficiency, that is, the degree of protection afforded rubber by their use, has been gradually improved by the discovery of new and better types of antioxidant compounds and by the use of mixtures of antioxidants. At the present time, the best results are generally obtained by mixtures of two or more compounds, each of which is effective as an antioxidant when employed by itself. While this art is rather highly developed, those skilled in the art continue to search for improved antioxidants and antioxidant compositions.

It is an object of the present invention to provide an improved method of inhibiting the deterioration of rubber. Another object is to provide a method for improving, or boosting, the efficiency of secondary aromatic amine antioxidants in rubber. A further object is to employ, with a rubber antioxidant, a compound which is not an antioxidant for rubber but which increases the efficiency of the rubber antioxidant. A still further object is to provide new and improved rubber antioxidant compositions. Other objects are to provide new compositions of matter and to advance the art. Still other objects will appear hereinafter.

The above and other objects may be accomplished in accordance with my invention which comprises incorporating in rubber a small proportion of a secondary aromatic amine antioxidant and a small proportion of a phthalocyanine consisting of carbon, hydrogen and nitrogen or of a metal complex of such a phthalocyanine in which the metal is selected from copper, silver, tin, cobalt, nickel, magnesium, zinc and aluminum. The above and other objects may also be accomplished by mixing one of the aforesaid phthalocyanines or metal complexes thereof with a secondary aromatic amine rubber antioxidant to provide a novel rubber antioxidant composition. I have found that, by the use of such phthalocyanine compounds with a secondary aromatic amine rubber antioxidant, the antioxidant efficiency of the antioxidant is very materially increased so that much greater protection of the rubber is obtained with no increase in the amount of antioxidant and smaller amounts of antioxidant may be employed to obtain a desired amount of protection of the rubber. This was particularly surprising in view of the fact that the phthalocyanine compounds employed are, in and of themselves, substantially ineffective as antioxidants.

The antioxidants, which may be employed in accordance with my invention, are those secondary aromatic amines which are effective by themselves to substantially inhibit the deterioration of rubber due to the action of light, heat and oxygen. It will be understood that by a secondary aromatic amine, I mean one in which both radicals attached to the nitrogen atom are aromatic radicals. Particularly satisfactory antioxidants are— para,para'-Dimethoxydiphenylamine
N,N'-diphenyl-para-phenylenediamine
N-phenyl-beta-naphthylamine
Diphenylamine The phthalocyanine compounds, which may be employed in accordance with my invention, are the metal-free phthalocyanines which consist of carbon, hydrogen and nitrogen and the metal complexes thereof in which the metals are selected from copper, silver, tin, cobalt, nickel, magnesium, zinc and aluminum. Certain other phthalocyanines, such as the iron, lead and chromium phthalocyanines, do not have the property of improving or boosting the efficiencies of secondary aromatic amine antioxidants and hence are excluded from my invention. The phthalocyanines, consisting of carbon, hydrogen and nitrogen, include phthalocyanine and the alkyl, aryl and aralkyl substituted derivatives of phthalocyanine, but exclude non-hydrocarbon substituents.

The amount of phthalocyanine compound, which may be employed in accordance with my invention, may be widely varied. Proportions of from about 0.00001% to about 1.0% of the phthalocyanine compound, based on the rubber, have been satisfactorily employed. Larger amounts may be employed if desired, but such larger amounts will generally be wasteful as no substantial improvement in results is obtained with such larger amounts. Preferably, the phthalocyanine compound is employed in the proportion of from about 0.00001% to about 0.1% by weight, based on the rubber, as substantially all of the boosting effect is obtained within such range. In general, the antioxidant will be employed in the proportion of about 0.25% to about 2.0% by weight of the rubber. The effectiveness of the phthalocyanine compounds will vary somewhat with their constitution and also with the antioxidant employed. It will also generally be desirable to vary the amount of the phthalocyanine compound with variations in the amount of antioxidant employed. From about 0.0001 part to about 0.5 part of phthalocyanine compound may be employed for each part of antioxidant. Usually, it will be desirable to employ from about 0.0001 part to about 0.1 part of phthalocyanine compound to each part of antioxidant. Preferably, I employ from about 0.0001 part to about 0.01 part of phthalocyanine compound to each part of antioxidant.

The phthalocyanine compound and the antioxidant may be added to the rubber together or separately, it being immaterial which is added first. However, I generally prefer to mix the phthalocyanine compound with the antioxidant to provide a new rubber antioxidant composition which is to be added to the rubber.

The efficiency of the antioxidant compositions of my invention was determined by comparing the resistance to flex-cracking on the Du Pont Flexing Machine (see Method C, ASTM, Designation D-430-35-T) of a rubber sample containing a standard rubber antioxidant to that of a similar rubber sample containing the same antioxidant plus a phthalocyanine of the described class. The resistance to flex-cracking was tested before aging, after aging in the 70° C. oxygen bomb and in the 70° C. air oven. All tests were made in the following stock, which was cured for 60 minutes at 25 pounds per square inch steam pressure. The amounts are in parts by weight.

| | |
|---|---|
| Smoked sheet | 100 |
| Zinc oxide | 5 |
| Channel black | 50 |
| Stearic acid | 3 |
| Pine tar | 1.5 |
| Sulfur | 3 |
| Accelerator[1] | 1.25 |
| Antioxidant | 1.0 |
| Booster | As indicated |

[1] A mixture of the zinc salt of mercaptobenzothiazole, 9% inert hydrocarbon and 9% diortho-tolylguanidine.

In the following tables are listed the efficiencies of phthalocyanine and certain metal derivatives of phthalocyanine. The efficiency is expressed in terms of the standard antioxidant having an efficiency of 100, that is, the antioxidant plus booster is compared directly to the antioxidant alone. The antioxidants in the tables are designated by numbers wherein

1 = para,para'-dimethoxydiphenylamine
2 = para,para'-dimethoxydiphenylamine + N,N'-diphenyl-para-phenylenediamine + N-phenyl-beta-naphthylamine
3 = N-phenyl-beta-naphthylamine
4 = Diphenylamine

TABLE I

*Unaged*

| Compound | Parts per 100 parts of rubber | Antioxidant | Parts per 100 parts of rubber | Efficiency (antioxidant=100) |
|---|---|---|---|---|
| Copper phthalocyanine [1] | 0.045 | #1 | 1.0 | 150 |
| Do.[1] | 0.45 | None | | 10 |
| None | | #1 | 1.0 | 100 |
| Copper phthalocyanine [1] | 0.045 | #2 | 1.0 | 119 |
| Do.[1] | 0.45 | None | | 11 |
| Do.[2] | 0.0002 | #2 | 1.0 | 137 |
| Do.[2] | 0.0005 | #2 | 1.0 | 142 |
| Do.[2] | 0.005 | #2 | 1.0 | 110 |
| None | | #2 | 1.0 | 100 |
| Copper phthalocyanine [1] | 0.045 | #3 | 1.0 | 113 |
| Do.[1] | 0.45 | #3 | 1.0 | 110 |
| Do.[1] | 0.45 | None | | 4 |
| None | | #3 | 1.0 | 100 |
| None | | None | | 12 |

[1] Added directly to the rubber as a dispersion in rubber.
[2] Dispersed in the antioxidant before addition to the rubber.

TABLE II

*Flex-cracking resistance after being bomb aged*

| Compound | Parts per 100 parts of rubber | Antioxidant | Parts per 100 parts of rubber | Efficiency (antioxidant=100) |
|---|---|---|---|---|
| Copper phthalocyanine [1] | 0.045 | #1 | 1.0 | 150 |
| Do.[1] | 0.45 | #1 | 1.0 | 147 |
| Do.[1] | 0.45 | None | | 10 |
| Tin chloride phthalocyanine [1] | 0.075 | #1 | 1.0 | 127 |
| Do.[1] | 0.25 | #1 | 1.0 | 120 |
| Do.[1] | 0.25 | None | | 10 |
| None | | #1 | 1.0 | 100 |
| Copper phthalocyanine [1] | 0.045 | #2 | 1.0 | 135 |
| Do.[1] | 0.45 | #2 | 1.0 | 133 |
| Do.[1] | 0.45 | None | | 7 |
| Do.[2] | 0.0002 | #2 | 1.0 | 166 |
| Do.[2] | 0.0005 | #2 | 1.0 | 150 |
| Do.[2] | 0.001 | #2 | 1.0 | 112 |
| Do.[2] | 0.005 | #2 | 1.0 | 132 |
| None | | #2 | 1.0 | 100 |
| Copper phthalocyanine [1] | 0.045 | #3 | 1.0 | 134 |
| Do.[1] | 0.225 | #3 | 1.0 | 137 |
| Do.[1] | 0.45 | #3 | 1.0 | 120 |
| Do.[1] | 0.45 | None | | 5 |
| None | | #3 | 1.0 | 100 |
| Copper phthalocyanine [1] | 0.045 | #4 | 1.0 | 103 |
| Do.[1] | 0.225 | #4 | 1.0 | 133 |
| Do.[1] | 0.45 | None | | 6 |
| None | | #4 | 1.0 | 100 |
| None | | None | | 10 |

[1] Added directly to the rubber as a dispersion in rubber.
[2] Dispersed in the antioxidant before addition to the rubber.

TABLE III

*Oven aged*

| Compound | Parts per 100 parts of rubber | Antioxidant | Parts per 100 parts of rubber | Efficiency (antioxidant=100) |
|---|---|---|---|---|
| Copper phthalocyanine | 0.045 | #2 | 1.0 | 107 |
| Do | 0.45 | #2 | 1.0 | 108 |
| Do | 0.45 | None | | 17 |
| None | | #2 | 1.0 | 100 |
| Copper phthalocyanine | 0.045 | #1 | 1.0 | 140 |
| Do | 0.45 | None | | 20 |
| Tin chloride phthalocyanine | 0.075 | #1 | 1.0 | 146 |
| Do | 0.25 | None | | 22 |
| Cobalt phthalocyanine | 0.075 | #1 | 1.0 | 127 |
| Do | 0.25 | None | | 18 |
| Nickel phthalocyanine | 0.075 | #1 | 1.0 | 188 |
| Do | 0.25 | None | | 20 |
| Metal-free phthalocyanine | 0.075 | #1 | 1.0 | 208 |
| Do | 0.25 | None | | 29 |
| None | | #1 | 1.0 | 100 |
| None | | None | | 20 |

From the above tests and results, it will be apparent that the phthalocyanine compounds of my invention are substantially ineffective as antioxidants by themselves, but that small amounts are extremely effective for increasing the antioxidant power of secondary aromatic amine antioxidants.

It will be understood that the above tests and specific embodiments are given for illustrative purposes solely and that many variations and modifications can be made in the phthalocyanines, antioxidants and other ingredients of the rubber compositions employed without departing from the spirit or scope of my invention. For example, other secondary aromatic amine rubber antioxidants, such as N-phenyl-alpha-naphthylamine, the alkoxydiphenylamines, the alkenoxydiphenylamines, the alkoxyphenyl-naphthylamines, the alkenoxyphenyl-naphthylamines, N,N'-diphenyl-para-phenylenediamine and N,N'-diphenyl-benzidine, may be employed in place of the antioxidants used in the above tests. Accordingly, my invention is not to be limited to the specific embodiments particularly disclosed, but I intend to cover my invention broadly as in the appended claims.

It will be apparent that, by my invention, I have discovered a class of phthalocyanine compounds which, when incorporated in rubber with a secondary aromatic amine rubber antioxidant, will very materially improve the efficiency of the antioxidant. Mixtures of the phthalocyanine compounds and the antioxidants constitute novel rubber antioxidant compositions which are unusually and unexpectedly effective for inhibiting the deterioration of rubber. Therefore, by the practice of my invention, it is possible to obtain much greater protection of the rubber with any particular amount of secondary aromatic amine antioxidant. Also, by the use of my invention, it is possible to obtain a desired amount of protection of the rubber with materially smaller amounts of antioxidant. These results are obtained by the use of phthalocyanines which have substantially no antioxidant effect when employed by themselves, that is, in the absence of an antioxidant. My invention is of particular value in colored rubber stocks as the phthalocyanine compounds employed are colored and tend to color white or light colored rubber stocks. However, where the coloring effect of the phthalocyanine compound is unobjectionable, it may be satisfactorily employed in white and light colored rubber stocks.

I claim:

1. The method of inhibiting the deterioration of rubber which comprises incorporating in the rubber a small proportion of a secondary aromatic amine antioxidant and from about 0.00001% to about 0.1% by weight, based on the rubber, of a member of the group consisting of phthalocyanines which consist of carbon, hydrogen and nitrogen and metal complexes of such phthalocyanines in which the metals are selected from the class consisting of copper, silver, tin, cobalt, nickel, magnesium, zinc and aluminum.

2. The method of inhibiting the deterioration of rubber which comprises incorporating in the rubber a small proportion of a secondary aromatic amine antioxidant and from about 0.00001% to about 0.1% by weight, based on the rubber, of a phthalocyanine consisting of carbon, hydrogen and nitrogen.

3. The method of inhibiting the deterioration of rubber which comprises incorporating in the rubber a small proportion of a secondary aromatic amine antioxidant and from about 0.00001% to about 0.1% by weight, based on the rubber, of phthalocyanine.

4. The method of inhibiting the deterioration of rubber which comprises incorporating in the rubber a small proportion of a secondary aromatic amine antioxidant and from about 0.00001% to about 0.1% by weight, based on the rubber, of a copper complex of a phthalocyanine consisting of carbon, hydrogen and nitrogen.

5. The method of inhibiting the deterioration of rubber which comprises incorporating in the rubber a small proportion of a secondary aromatic amine antioxidant and from about 0.00001% to about 0.1% by weight, based on the rubber, of copper phthalocyanine.

6. Rubber having incorporated therein a small proportion of a secondary aromatic amine antioxidant and from about 0.00001% to about 0.1% by weight, based on the rubber, of a member of the group consisting of phthalocyanines which consist of carbon, hydrogen and nitrogen and metal complexes of such phthalocyanines which consist of carbon, hydrogen and nitrogen in which the metals are selected from the class consisting of copper, silver, tin, cobalt, nickel, magnesium, zinc and aluminum.

7. Rubber having incorporated therein a small proportion of a secondary aromatic amine antioxidant and from about 0.00001% to about 0.1% by weight, based on the rubber, of a phthalocyanine consisting of carbon, hydrogen and nitrogen.

8. Rubber having incorporated therein a small proportion of a secondary aromatic amine antioxidant and from about 0.00001% to about 0.1% by weight, based on the rubber, of phthalocyanine.

9. Rubber having incorporated therein a small proportion of a secondary aromatic amine antioxidant and from about 0.00001% to about 0.1% by weight, based on the rubber, of a copper complex of a phthalocyanine consisting of carbon, hydrogen and nitrogen.

10. Rubber having incorporated therein a small proportion of a secondary aromatic amine antioxidant and from about 0.00001% to about 0.1% by weight, based on the rubber, of copper phthalocyanine.

11. A rubber antioxidant composition comprising a mixture of 1 part of a secondary aromatic amine antioxidant and from about 0.0001 to about 0.5 part of a member of the group consisting of phthalocyanines which consist of carbon, hydrogen and nitrogen and metal complexes of such phthalocyanines in which the metals are selected from the class consisting of copper, silver, tin, cobalt, nickel, magnesium, zinc and aluminum.

12. A rubber antioxidant composition comprising a mixture of 1 part of a secondary aromatic amine antioxidant and from about 0.0001 to about 0.5 part of a phthalocyanine consisting of carbon, hydrogen and nitrogen.

13. A rubber antioxidant composition comprising a mixture of 1 part of a secondary aromatic amine antioxidant and from about 0.0001 to about 0.5 part of phthalocyanine.

14. A rubber antioxidant composition comprising a mixture of 1 part of a secondary aromatic amine antioxidant and from about 0.0001 to about 0.5 part of a copper complex of a phthalocyanine consisting of carbon, hydrogen and nitrogen.

15. A rubber antioxidant composition comprising a mixture of 1 part of a secondary aromatic amine antioxidant and from about 0.0001 to about 0.5 part of copper phthalocyanine.

JOHN R. VINCENT.